UNITED STATES PATENT OFFICE.

WILHELM BERGDOLT, OF LEVERKUSEN, NEAR COLOGNE, GERMANY, ASSIGNOR TO FARBENFABRIKEN VORM. FRIEDR. BAYER & CO., OF ELBERFELD, GERMANY, A CORPORATION OF GERMANY.

GREEN AZO DYE.

974,346.

No Drawing.

Specification of Letters Patent. Patented Nov. 1, 1910.

Application filed February 12, 1910. Serial No. 543,490.

*To all whom it may concern:*

Be it known that I, WILHELM BERGDOLT, doctor of philosophy, chemist, citizen of the German Empire, residing at Leverkusen, near Cologne, Germany, have invented a New Dye, of which the following is a specification.

My invention relates to the manufacture and production of new green azo dyestuffs which can be obtained by combining the tetrazo compounds of a para-diamin with one molecule of an ortho-oxy-carboxylic acid and with one molecule of an azo dyestuff obtained from diazotized anilin disulfonic acid and an 1.8-aminonaphthol sulfonic acid. The dyes thus obtained are in the shape of their alkaline salts dark powders soluble in water generally with a green color; upon reduction with stannous chlorid and hydrochloric acid they are decomposed, a para-diamin, an amino-ortho-oxy-carboxylic acid, an anilin disulfonic acid and a triamino-8-oxynaphthalene sulfonic acid being obtained. They are valuable green substantive dyestuffs, which possess an extraordinary pureness of shade. They are especially suitable for dyeing half-wool.

In order to illustrate the new process more fully the following example is given, the parts being by weight:—21.3 parts of tolidin are tetrazotized with a solution of 14 parts of sodium nitrite and hydrochloric acid. The tetrazo compound is combined with a solution of 14.2 parts of salicylic acid containing an excess of sodium carbonate. Subsequently 14.75 parts of anilin disulfonate of sodium (1:2:5) are dissolved in hot water, 50 parts of hydrochloric acid (19.5° Bé.) are added thereto and the amin is then diazotized with a solution of 6.9 parts of sodium nitrite. To the diazo compound thus produced a neutral solution of 23.8 parts of 1.8-aminonaphthol-4-sulfonic acid is added. The mixture is stirred for several hours. The formation of the dye is then complete. 15 parts of sodium carbonate are added to the mixture to obtain a solution and then the intermediate product of tetrazotized tolidin and salicylic acid is added. After some hours the dye is salted out, filtered off and dried. It is after being dried and pulverized in the shape of its sodium salt a dark powder soluble in hot water with a green color and soluble in concentrated sulfuric acid with a bluish-violet color; upon reduction with stannous chlorid and hydrochloric acid the dye is split up into tolidin aminosalicylic acid, triamino-8-naphthol-4-sulfonic acid and anilin disulfonic acid (1:2:5). It dyes half-wool pure green shades.

The process is carried out in an analogous manner on using other of the above mentioned components, *e. g.* instead of tolidin, benzidin or dianisidin, instead of salicylic acid cresotinic acid or chloro-salicylic acid and other aminonaphthol sulfonic acids, such as 1.8.3.6- or 1.8.4.6-aminonaphthol disulfonic acid.

I claim:—

1. The herein-described new azo dyestuffs obtainable from a para-diamin, an ortho-oxy-carboxylic acid, an 1.8-aminonaphthol sulfonic acid and an anilin-disulfonic acid, which dyestuffs are, after being dried and pulverized, in the shape of their alkaline salts dark powders soluble in hot water generally with a green color; yielding upon reduction with stannous chlorid and hydrochloric acid a para-diamin, an amino-ortho-oxy-carboxylic acid, an anilin-disulfonic acid and a triamino-8-naphthol sulfonic acid; and dyeing half-wool green shades, substantially as described.

2. The herein-described new azo dyestuff obtainable from tolidin, salicylic acid, 1.8-aminonaphthol-4-sulfonic acid and 1.2.5-anilin-disulfonic acid, which dyestuff is, after being dried and pulverized, in the shape of its sodium salt a dark powder soluble in hot water with a green color and soluble in concentrated sulfuric acid with a bluish-violet color, yielding upon reduction with stannous chlorid and hydrochloric acid tolidin, aminosalicylic acid, 1.2.5-anilin-disulfonic acid and triamino-8-naphthol-4-sulfonic acid; and dyeing half-wool green shades, substantially as described.

In testimony whereof I have hereunto set my hand in the presence of two subscribing witnesses.

WILHELM BERGDOLT. [L. S.]

Witnesses:
  OTTO KÖNIG,
  CHAS. J. WRIGHT.